(12) United States Patent
Mayet (10) Patent No.: US 7,073,553 B2
(45) Date of Patent: Jul. 11, 2006

(54) DEVICE FOR THE FABRICATION OF A TIRE REINFORCEMENT, HAVING MULTIPLE POSITIONING ARMS WHICH UNDERGO A MOVEMENT GUIDED BY A CAM FOLLOWER SLIDING IN A SLOT

(75) Inventor: Jean-Claude Mayet, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 85 days.

(21) Appl. No.: 10/725,884

(22) Filed: Dec. 1, 2003

(65) Prior Publication Data

US 2004/0108073 A1 Jun. 10, 2004

(30) Foreign Application Priority Data

Dec. 4, 2002 (FR) .................................. 02 15307

(51) Int. Cl.
*B29D 30/16* (2006.01)
(52) U.S. Cl. ...................................... 156/397; 156/398
(58) Field of Classification Search ................ 156/117, 156/397, 398, 133, 446
See application file for complete search history.

(56) References Cited

U.S. PATENT DOCUMENTS

| 3,082,140 A | 3/1963 | Vanzo | |
| 2001/0023736 A1* | 9/2001 | Mayet | ......................... 156/117 |
| 2002/0117265 A1* | 8/2002 | Mayet | ......................... 156/400 |

FOREIGN PATENT DOCUMENTS

EP 1 122 057 A2 8/2001

* cited by examiner

*Primary Examiner*—Geoffrey L. Knable
(74) *Attorney, Agent, or Firm*—Cohen, Pontani, Lieberman & Pavane (57) ABSTRACT

Device for fabricating a tire reinforcement by laying a cord 4 on a core 1. An actuation mechanism 3 is provided for transporting the cord laying element in a cyclic, back and forth movement, bringing it in successive cycles close to each of the ends desired for the cord in the said trajectory. The actuation mechanism comprises at least a main arm 31, a front auxiliary arm 32 and a rear auxiliary arm 33, the main arm 31 being articulated on the front auxiliary arm 32 and being mounted on the rear auxiliary arm 33 by a cam follower that cooperates with a slot 312.

8 Claims, 6 Drawing Sheets

DEVICE FOR THE FABRICATION OF A TIRE REINFORCEMENT, HAVING MULTIPLE POSITIONING ARMS WHICH UNDERGO A MOVEMENT GUIDED BY A CAM FOLLOWER SLIDING IN A SLOT

FIELD OF THE INVENTION

The present invention relates to the manufacture of tires. More precisely, it concerns the positioning of cords to constitute a tire reinforcement. More particularly, it proposes means suitable in particular for fabricating such reinforcement on a form close to or identical with the shape of the tire's internal cavity, i.e. one having an essentially toroidal shape, which supports the tire blank during its fabrication.

BACKGROUND OF THE INVENTION

In this technical field processes and equipment are already known which enable the fabrication of tire reinforcements to be integrated with the assembly of the tire itself. This means that rather than having recourse to semi-finished products such as reinforcement plies, one or more reinforcements are made in situ, as the tire is being fabricated, and from a cord spool. Among the processes and equipment, the solution described in patent application EP 1 122 057 is well suited to the production of carcass reinforcements on a rigid core whose outer surface corresponds essentially to the shape of the internal cavity of the final tire. The document describes a device in which the cord intended to form a carcass reinforcement is positioned in contiguous arcs on a rigid core by a mechanism having at least two arms arranged in cascade, which undergo a back and forth movement around the core so as to put in place, progressively and in a contiguous manner, an arc each time it moves one way and an arc each time it moves the other way, with pressing elements appropriate for applying the ends of the arcs as they are formed on the rigid core. The core has previously been covered with uncured rubber in accordance with the structure of the tire, which has the advantageous property of allowing the arcs to be stuck on and kept in place sufficiently well at least for the purposes of fabrication.

The laying of the cords on the core is the more exact, the closer the eyelet through which the cord passes approaches the core in the zone corresponding to the bead of the future tire. In certain implementations of this invention it is best to add at least a third arm, to allow a closer approach to the base of the tire bead. The problem that arises is to control the actual movement of this end arm. Various ways of controlling the movement of the end arm are possible, but they are all to some extent complex and they add weight to the mechanism.

SUMMARY OF THE INVENTION

One object of the present invention is to provide a simplified device which nevertheless allows a close approach to the ends of the trajectory.

This and other objects are attained in accordance with one aspect of the present invention directed to a device for fabricating a tire reinforcement, the device being designed to produce a reinforcement formed from a cord. The device comprises a frame and is intended for use in cooperation with an essentially toroidal form mounted on the frame so that it can rotate about a rotation axis, on which the reinforcement is built up progressively by laying arcs of the cord along a trajectory desired for the cord at the surface of the form. The device includes a cord laying element through which the cord can slide. An actuation mechanism is mounted on the frame, to transport the cord laying element in a cyclic, back and forth movement, bringing it in successive cycles close to each of the ends desired for the cord in the trajectory. The actuation mechanism comprises at least one main arm and two auxiliary arms, namely a front auxiliary arm and a rear auxiliary arm, each auxiliary arm being articulated on a geometrical rotation axis, the respective geometrical rotation axes being essentially parallel to one another and a distance apart. Pressing elements are provided which are close to each end of the trajectory, for applying the cord onto the form at least at the ends. The main arm is mounted on one of the auxiliary arms via a rotation axis parallel to the geometrical rotation axes forming an articulation between the main arm and the auxiliary arm considered, and is mounted on the other auxiliary arm by means of a cam follower which cooperates with an orifice.

The reader is invited to consult the patent application EP 1 122 057 cited earlier, since the tire fabrication process used in the present application is identical to that in the application. The device is intended for use with a motorization system that controls in synchronism the rotation of the form, the actuation mechanism and the pressing elements. In addition, the present invention uses the pressing elements described in patent application EP 1 122 057 (an assembly comprising a hammer and a fork), to allow the formation of a loop with the reinforcing cord and to apply the loop against the core.

Before embarking on a detailed description of the new means of actuating the cord laying element, a few useful points will be recalled.

Note, first, that as in the patent application E 1 122 057 already cited, the term "cord" is of course used in an entirely general sense, which encompasses a monofilament, a multifilament, an assembly such as a cable or yarn, or a small number of cables or yarns grouped together, and this regardless of the nature of the material, and that the "cord" may or may not be pre-coated with rubber. In the present text the term "arc" is used to denote a section of cord extending from a particular point to another in the reinforcement. The totality of these arcs arranged all around the tire forms the reinforcement itself. An arc in the sense defined here can be part of a carcass, or a crown reinforcement, or any other type of reinforcement. These arcs may be individualized by cutting the cord while positioning it, or they may all be interconnected in the final reinforcement, for example by loops.

Basically, the invention relates to the continuous laying of a reinforcing cord in a configuration as close as possible to its configuration in the final product. The cord is fed in as required by a suitable distributor comprising for example a cord spool and if necessary a device to control the tension of the cord reeled off the spool. The device for fabricating a reinforcement from a single cord cooperates with a form (rigid core or reinforced membrane) on which the tire is built up. It is of little importance whether the reinforcement is fabricated in several successive rotations of the form in front of the cord laying elements described, with or without cutting of the cord between successive rotations.

When positions, directions or senses are defined using the words "radially, axially, circumferentially", or when radii are mentioned, these terms relate to the core on which the tire is being built up or to the tire itself, which amounts to the same thing. The reference geometrical axis is the rotation axis of the form.

In addition, the cord laying elements described here also make it possible to produce a reinforcement, for example a carcass reinforcement, with variable spacing of the cord. "Spacing" is understood to mean the distance comprising the interval between two adjacent cords plus the diameter of the cord. It is well known that for a carcass reinforcement the interval between cords varies depending on the radius at which it is measured. It is not that variation which is referred to here, but a spacing variation at a given radius. To produce this it is sufficient, without changing the working rate of the cord laying element, to vary the form rotation speed in accordance with any appropriate law. This gives a tire whose carcass reinforcement cords, for example in the case of a radial carcass, are arranged according to a controlled spacing variation for a given radial position.

Finally, the multiple arms cause the cord laying element to undergo movement essentially confined to a plane—hereinafter called the movement plane—perpendicular to the geometrical rotation axis of the arm(s). In certain particular implementations of the invention, as in the patent application EP 1 122 057 cited earlier, the movement plane is itself subject to a movement with a functional role, as will become apparent below.

BRIEF DESCRIPTION OF THE DRAWINGS

The remainder of the description, which refers to the following figures, makes clear all aspects of the invention.

DETAILED DESCRIPTION OF THE DRAWINGS

Figure 1:
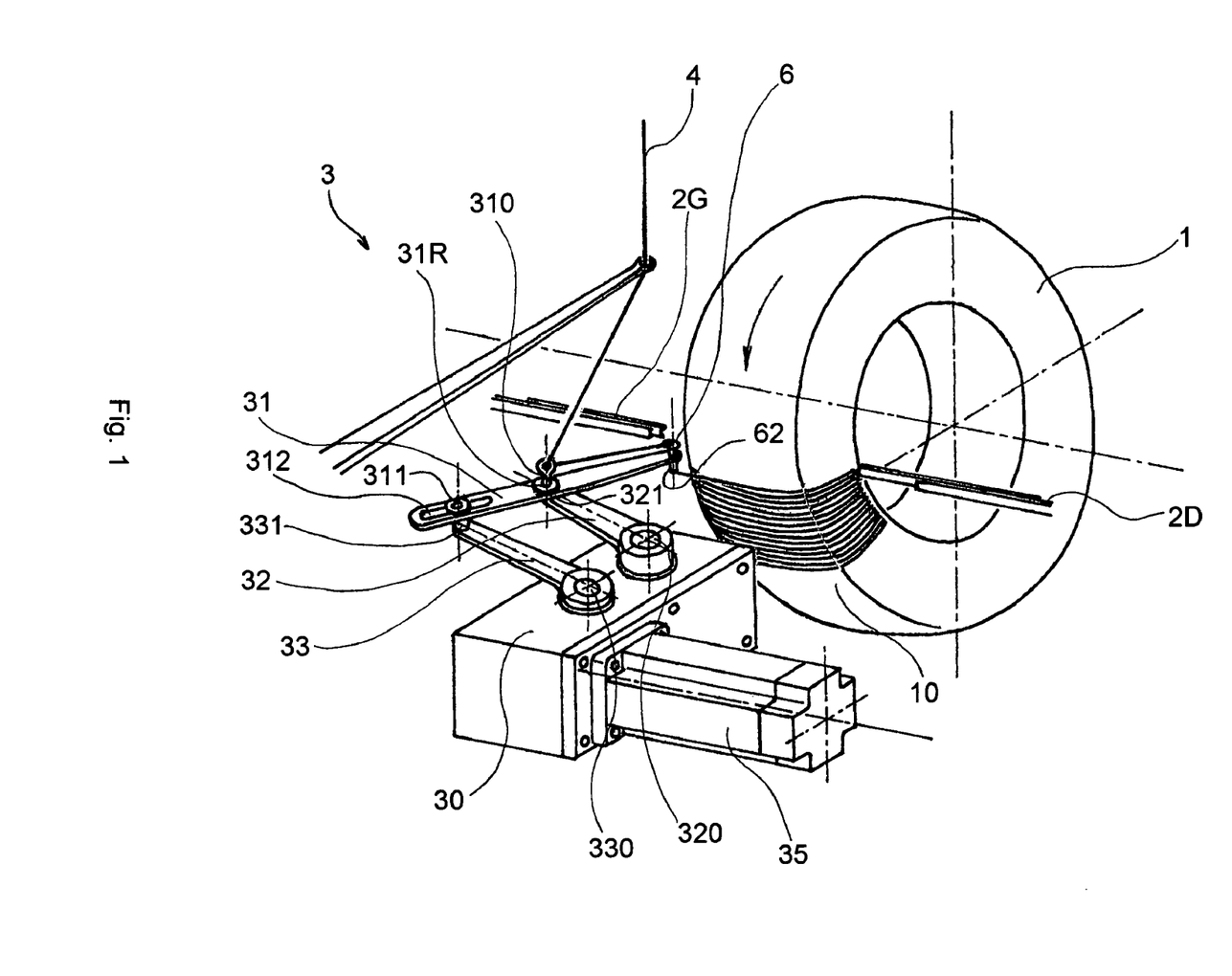
FIG. 1 is a schematic perspective view of a first embodiment of a device according to the invention.

In FIG. 1 (and indeed in all the examples described, although this is not limiting), the form is a core 1 (rigid and capable of disassembly) which defines the geometry of the internal surface of the tire. This is coated with rubber 10 (see FIG. 2), for example with a layer of gas-impermeable rubber based on butyl rubber and a layer of rubber that ensures the anchoring of the carcass cords on the core during fabrication and then their embedding within the vulcanized tire. The rubber 10 covering the core 1 enables a cord 4 to be retained on the core 1 as it is laid, by a sticking effect. Of course, the core 1 is driven in rotation by any appropriate means (not shown).

The present invention proposes a multiple-arm actuation mechanism which, compared with the one described in patent application EP 1 122 057, has the advantage of being able to bring the eyelet very close to the core without having recourse to three arms in series, and so without having to control the movement of the third of the arms in cascade arranged in series.

FIG. 1 shows an actuation mechanism 3 with multiple arms mounted on a carriage 30. The multiple-arm actuation mechanism 3 comprises a main arm 31 at whose end an eyelet 6 is fitted. In this example the main arm 31 directly supports the cord laying element. In all the examples described here the element for laying the cord 4 is embodied by the eyelet 6 (without this being limiting). It should be recalled that the multiple-arm actuation mechanism 3 carries out the function fulfilled by the chain mechanism in patent application EP 0 580 055, and that the pressing elements 2G and 2D are positioned in a manner appropriate for playing the part described in patent application EP 0 580 055.

The eyelet 6 is similar to that already described in patent application E 1 122 057. Its outlet orifice 62 describes a movement in the movement plane of the cord laying element. The edges of the orifice 62 should be carefully made so as not to harm the cord 4, as the emerging strand of the latter is generally positioned essentially in the movement plane, i.e. in a plane perpendicular to the walls of the eyelet 6. As a variant, the eyelet can be orientated so as to approach the average orientation of the cord at the outlet of the eyelet.

The main arm 31 is mounted on the carriage 30 by means of a front auxiliary arm 32 and a rear auxiliary arm 33. The front auxiliary arm 32 is mounted on a spindle 320 and the rear auxiliary arm 33 is mounted on a spindle 330. The geometrical center of rotation 31R of the main arm 31 is located at the end 321 of the front auxiliary arm 32: the main arm 31 is mounted on the front auxiliary arm 32 by means of an axle 310 positioned at the geometrical center of rotation 31R, which forms an articulation between the main arm 31 and the front auxiliary arm 32. The axle 310 is also mounted in the central portion of the main arm 31. A slot 312 is formed in the main arm 31. The slot 312 is located on the side of the geometrical center of rotation 31R opposite to the eyelet 6. A lug 311 is mounted at the end 331 of the rear auxiliary arm 33. The lug 311 passes through the slot 312 of the main arm 31 so as to be able to guide the main arm 31.

In the arrangement described in patent application EP 1 122 057, the actuation mechanism with arms arranged in cascade formed a parallelogram (spindles 31, 32 and 34), and the spindles 31 and 34 were of equal length and had movements which were necessarily identical; as for the arm 32 carried by the arms 31 and 34, it described a movement while always remaining parallel to itself (all the underlined indexes mentioned at the beginning of this paragraph refer to patent application EP 1 122 057). In contrast, in the present invention, thanks to the installation of a cam and follower function embodied by the slot 312 cut out at one end of the main arm 31 and the lug 311, the front auxiliary arm 32 and the rear auxiliary arm 33 can have different lengths (referring here to the functional length measured between the rotation center of the auxiliary arm considered and the lug 311 or the axle 310), and/or the front and rear auxiliary arms 32, 33 can have oscillation movements of different amplitudes. Functionally, the invention makes it possible for the main arm 31, during its movement, not to remain parallel to itself. It can adopt a certain inclination, as indicated in particular in FIG. 2, which allows the eyelet 6 to approach the bead of the future tire even in the case when the fabrication form is narrower at the level of the tire bead than half-way up the sidewall.

Figure 2:
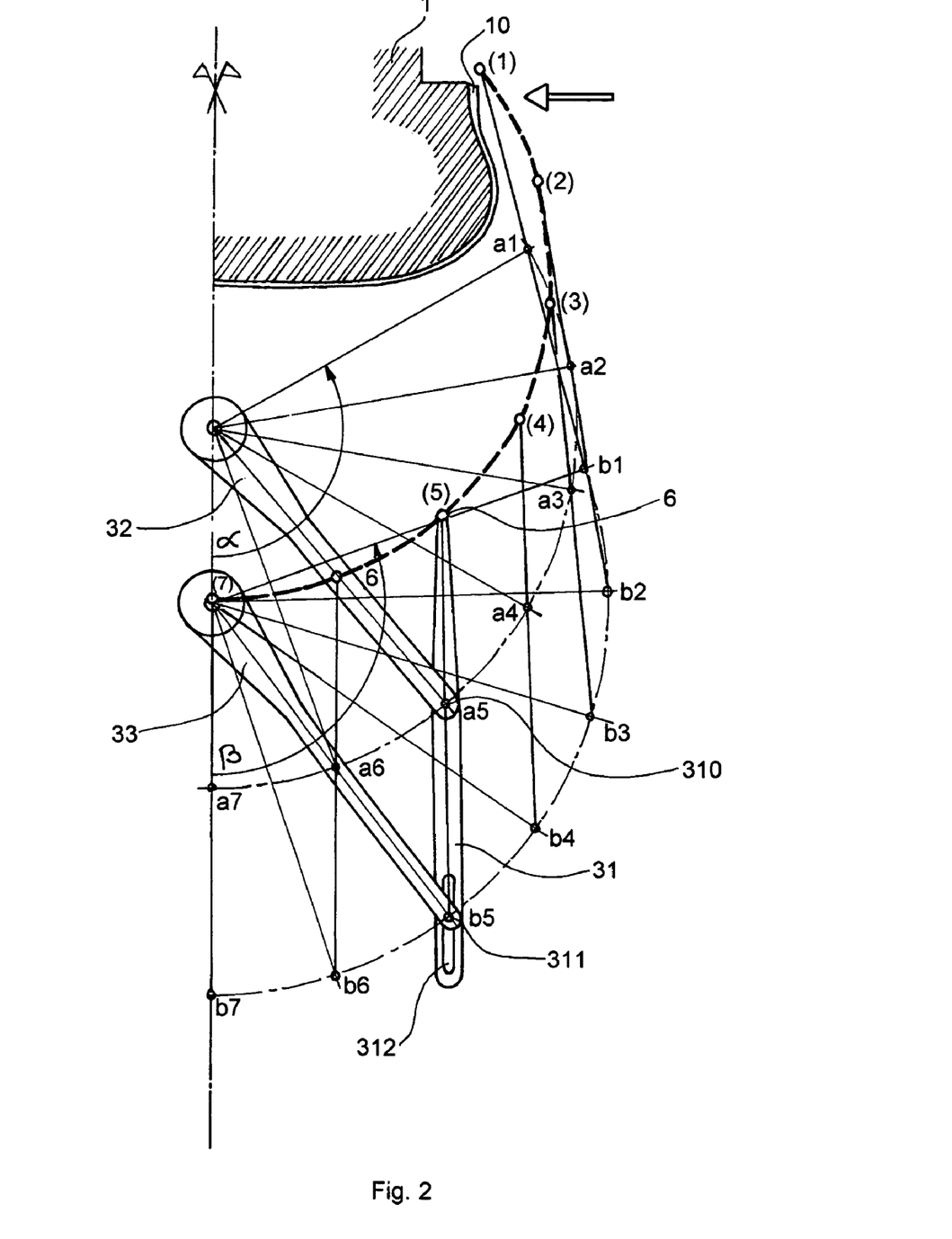
FIG. 2 represents successive stages in the operation of the first embodiment.

The choice of the degree of inclination, i.e. the approach to the zone of the future tire bead, is obtained by adjusting the respective lengths of the auxiliary arms and/or the respective amplitudes of their oscillatory movements. FIGS. 1 and 2 illustrate a solution in which the auxiliary spindles 32 and 33 have slightly different movements. The auxiliary arms do not rotate continuously, but oscillate within the limits of an arc smaller than 360°, whose precise value depends on the exact constitution of the multiple-arm actuation mechanism 3 and on the application envisaged. The spindles 320 and 330 are connected to one another by an internal mechanism of the carriage 30 so designed that the spindle 320 can oscillate through an amplitude for example of about 240° while the spindle 330 can oscillate through an amplitude for example of about 220°. The two spindles are controlled by one and the same motor 35.

As a variant, the spindles 320 and 330 could each be controlled by its own electric motor and the two electric motors could each be piloted so as to carry out synchronized movements, but with relative amplitudes which are if necessary slightly different.

FIG. 2 is a schematic representation of the movements of the multiple-arm actuation mechanism 3, showing the main arm 31, the front auxiliary arm 32 and the rear auxiliary arm 33. The curve drawn as a thick broken line passing through the points (1), (2), (3), (4), (5), (6) and (7) represents the movement of the eyelet 6. The curve drawn as a dot-dash line passing through the points a1, a2, a3, a4, a5, a6 and a7 represents the movement in space of the axle 310, i.e. also the movement in space of the rotation center 31R of the main arm 31. Finally, the curve passing through the points b1, b2, b3, b4, b5, b6 and b7 represents the movement in space of the lug 311. It can be seen from FIG. 2 that the front and rear auxiliary arms 32 and 33 are of equal length (this being only a particular case, but not obligatory). Since the amplitude of their movement is not identical, this will result in a variable inclination of the main arm 31.

The mechanism is mounted in such manner that there is a configuration in which the auxiliary arms are aligned exactly on the axis of symmetry of the figure. If the axle 310 is at the point a7 and the lug 311 is at the point 67 (which is not the position shown in FIG. 2), the main arm 31 will then be arranged exactly on the axis of symmetry of the figure and exactly aligned with the front and rear auxiliary arms 32 and 33. Since the movement amplitude of the rear auxiliary arm is slightly smaller than the movement amplitude of the front auxiliary arm, as the front and rear auxiliary arms 32 and 33 turn from their position in which they coincide with the axis of symmetry of the figure to reach the extreme position of their oscillation movement, in a first stage the main arm 31 will incline relative to the axis of symmetry of the figure in such manner that the eyelet 6 moves away from the axis of symmetry of the figure slightly more than the axle 310 and even more than the position of the slot 312 in which the lug 311 is engaged.

Then, there is an intermediate position of the front and rear auxiliary arms 32 and 33 in which the main arm 31 is once more exactly parallel to the axis of the figure. Finally, when the front and rear auxiliary arms 32 and 33 approach the limit of their oscillation, the main arm 31 inclines in such manner that the eyelet 6 is closer to the axis of the figure than the axle 310 and even closer than the lug 311. By choosing the relative amplitudes of the movements of the front and rear auxiliary arms 32 and 33 correctly, the eyelet 6 can be brought to a position extremely close to the bead of the future tire.

Figure 3:
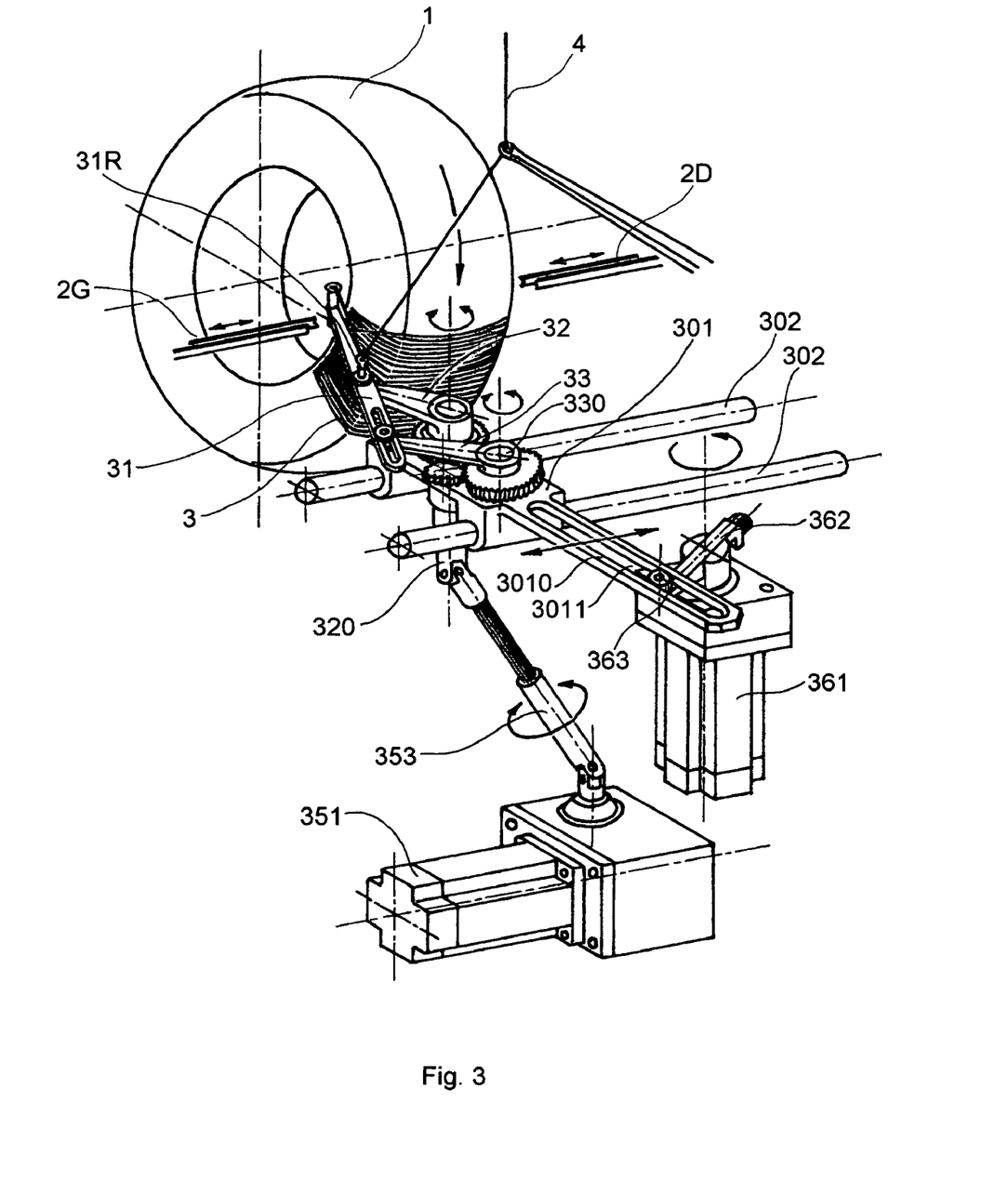
FIG. 3 is a schematic perspective view of a second embodiment of a device according to the invention.

FIG. 3 shows a carriage 301 that constitutes a support carrying a multiple-arm actuation mechanism 3 which is identical in all respects to the one described above. In particular, this actuation mechanism 3 comprises the main arm 31 and the front and rear auxiliary arms 32 and 33. The specific feature of this embodiment is that the carriage 301 is mounted to slide on two parallel bars 302. The carriage 301 has a foot 3010 in which a slot 3011 is cut. The carriage 301 can undergo an alternating translation movement guided by the bars 302, thanks to a motor 361 which controls a lever 362. At the end of the lever 362 is fitted a lug 363 which is engaged in the slot 3011. The movement of the multiple-arm actuation mechanism 3 is controlled by a motor 351 which drives the spindle 320 via a telescopic spindle 353. The spindle 330 is driven by the spindle 320 via a gear system. The advantage of this embodiment is that it confers upon the multiple-arm actuation mechanism 3 an additional degree of freedom of movement by the translation of the carriage 301 supporting it, which is useful in particular for increasing the capacity for laying widths parallel to the rotation axis of the core 1.

Figure 4:
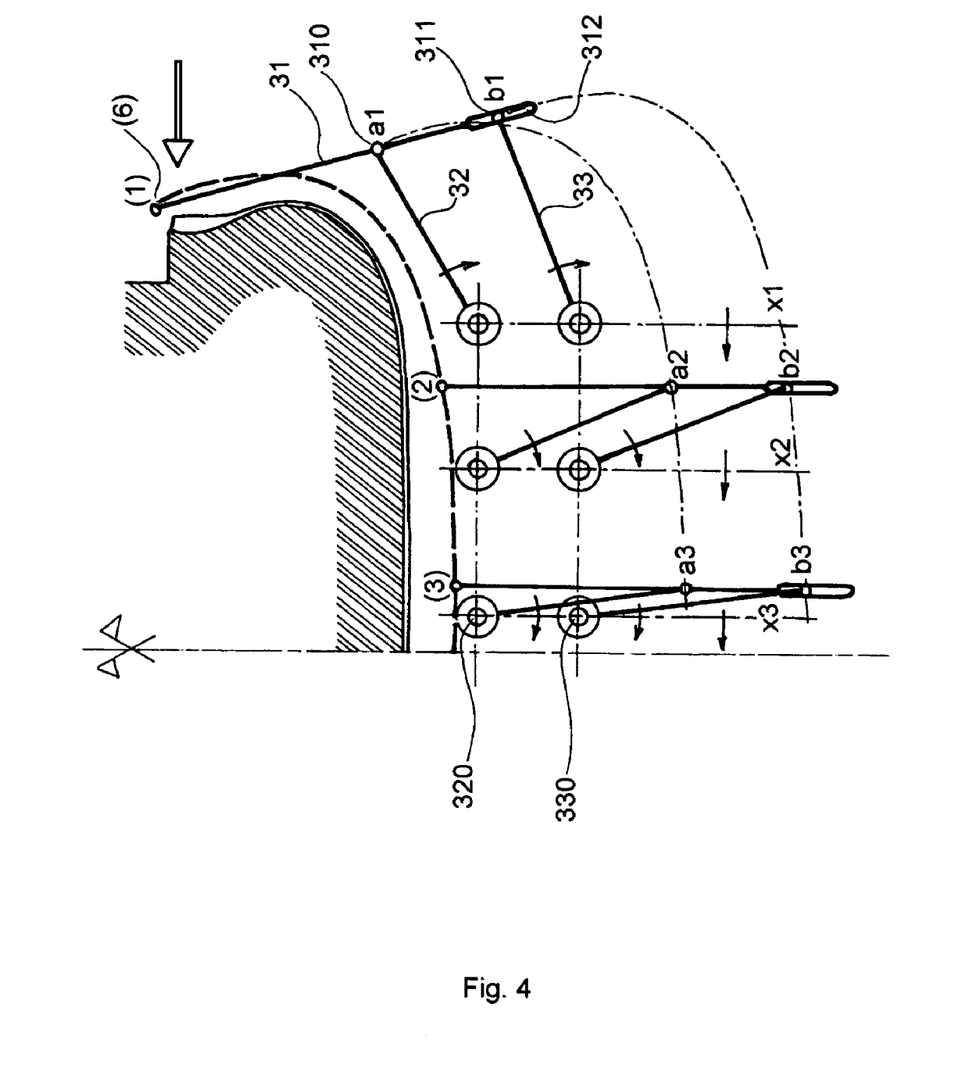
FIG. 4 represents successive stages in the operation of the second embodiment.

The translation movement of the carriage 301, combined with the movement of the multiple-arm actuation mechanism 3 already described, are illustrated in FIG. 4. Respective positions x1, x2 and x3 are shown, which are the trace of an imaginary plane connecting the geometrical axes of the spindles 320 and 330. The displacement of the carriage 301 causes a displacement of the spindles 320 and 330, and hence a displacement of the centers of rotation of the front 32 and rear 33 auxiliary spindles. Superposition of this transverse displacement on the intrinsic movement of the multiple-arm actuation mechanism 3 as explained with the help of FIG. 2, gives the following overall movements: the curve drawn with a thick broken line passing through the points (1), (2), and (3) represents the movement of the eyelet 6; the curve drawn with a dot-dash line passing through the points a1, a2 and a3 represents the movement in space of the axis 310, i.e. also the movement in space of the center of rotation 31R of the main arm 31; finally, the curve passing through the points b1, b2 and b3 represents the movement in space of the lug 311.

Figure 5:
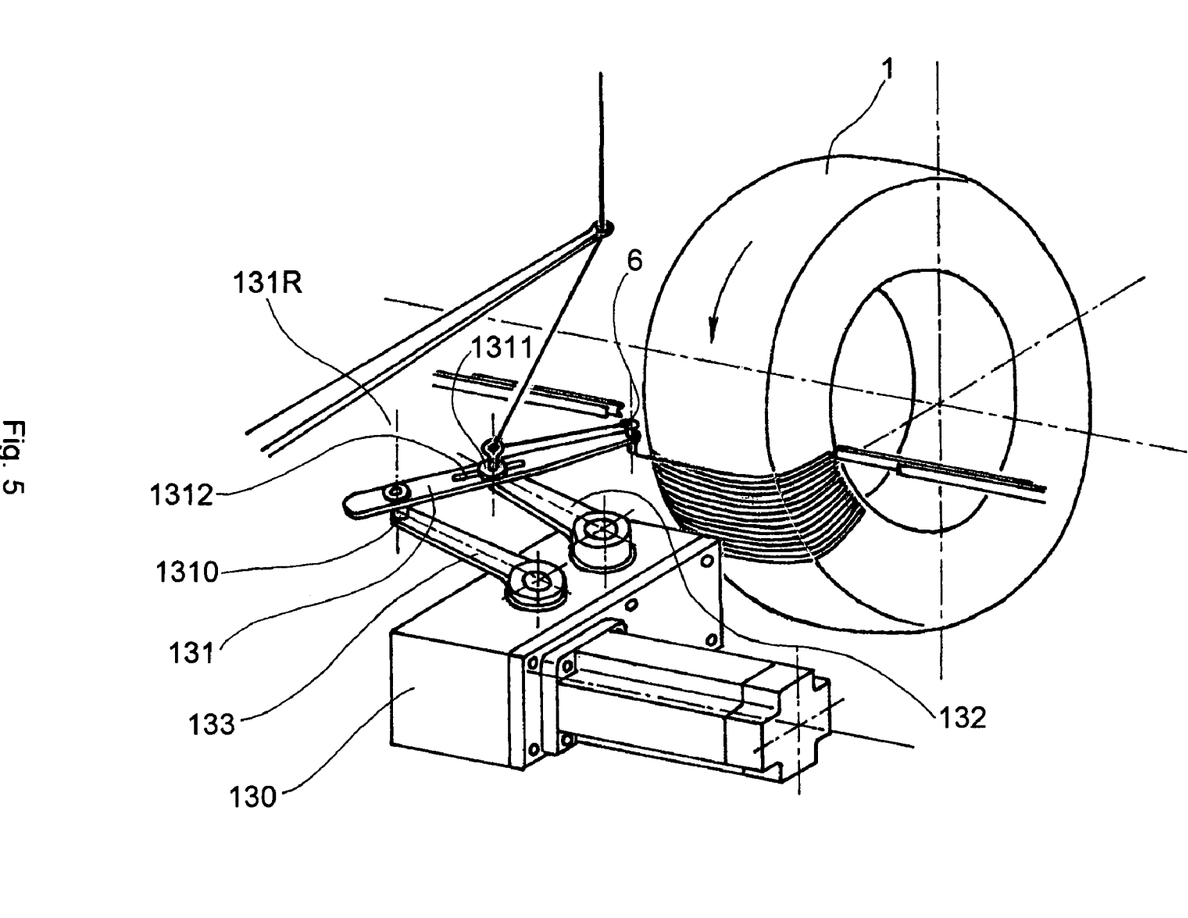
FIG. 5 is a schematic perspective view showing a third embodiment of a device according to the invention.

As a further variant, the slot could be made in the median portion of the main spindle and the latter's center of rotation at its end opposite to the eyelet 6. This is illustrated in FIG. 5. In this variant a main arm 131 can be seen mounted on a carriage 130 by means of a front auxiliary arm 132 and a rear auxiliary arm 133. A specific feature of this variant is that the geometrical center of rotation 131R of the main arm 131 is located at the end of the rear auxiliary arm 133: the main arm 131 is mounted on the rear auxiliary arm 133 by means of an axle 1310 positioned at the geometrical center of rotation 131R, which forms an articulation between the main arm 131 and the rear auxiliary arm 133. The axle 1310 is also mounted in the rear end portion of the main arm 131. A slot 1312 is formed in the central portion of the main arm 131. The slot 1312 is positioned between the geometrical center of rotation 131R and the eyelet 6. A lug 1311 is mounted at the end of the front auxiliary arm 132. The lug 1311 passes through the slot 1312 of the main arm 131 in order to be able to guide the main arm 131.

Figure 6:
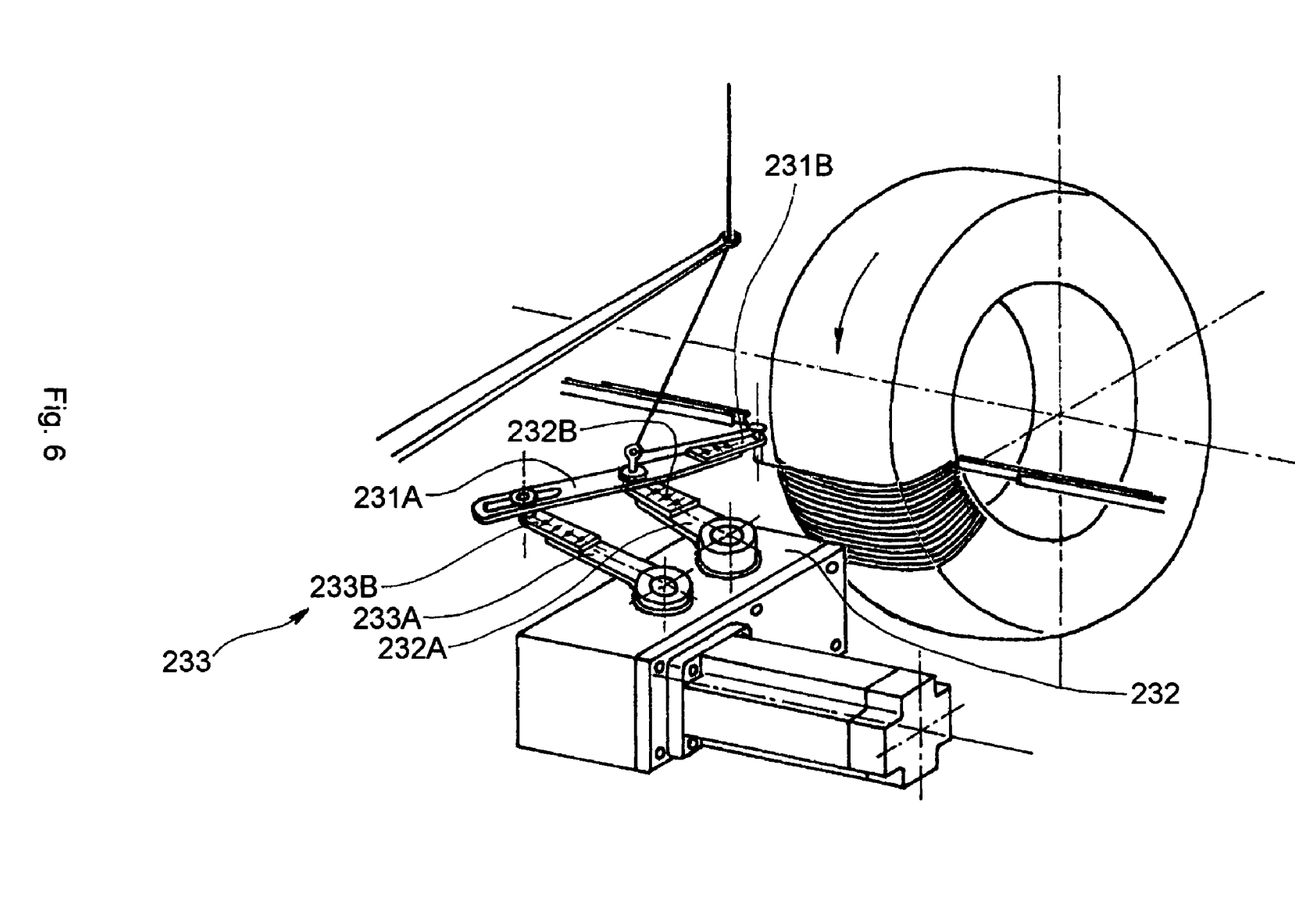
FIG. 6 is a schematic perspective view showing a variant embodiment of a device according to the invention.

FIG. 6 shows adjustment options that can be used with all the variants described above. As can be seen, the functional length of each of the front and rear auxiliary arms 232 and 233 is adjustable, since each auxiliary arm is itself made in two parts. The end portion 232B can be adjusted to different positions on the base 232A of the front auxiliary arm 232, and the same for the rear auxiliary arm 233. Similarly, the axle 1310 can be fitted on the main arm 131 in different positions. Finally, the eyelet 6 [p. 9, I. 9] the useful functional length of the main arm 131 can be adjusted by positioning the end portion 231B at different locations on the base 231A of the main arm 231. These adjustment means can be used independently or concomitantly with the adjustment of the different movement amplitudes of the auxiliary arms, or even the movements of the arms can be controlled by different motors to provide still greater flexibility.

In summary, the actuation mechanism of the cord laying means is preferably such that the movements of the auxiliary arms, which are synchronized, can be adjusted according to different amplitudes. In another aspect, which can be taken together with the above, the actuation mechanism of the cord laying means is preferably such that the synchronized movement of the auxiliary arms is controlled by different motors.

The multiple-arm actuation mechanism 3 as a whole is fairly compact. The assembly of the cord laying elements, namely the multiple-arm actuation mechanism 3 and the pressing elements 2, including the motor and drive mechanism, form a sub-assembly which can easily be brought up to the core in an appropriate way and can be moved away, for example to allow other devices used for tire fabrication to be brought to the core or to transfer the core to other tire building positions. In the examples shown, the main arm 31 can pass around the sidewall of the form for fabricating the future tire, so that the eyelet 6 is brought very close to the bead thanks to the inclination of the main arm 31 explained above. Of course, and although this may seem less useful having regard to the precise design options of the concrete embodiments of the invention, the inclination of the main arm 31 at the end of its travel could be inverted.

I claim:

1. A device for fabricating a tire reinforcement made from a cord, said device comprising:
   a frame, wherein the device is adapted to cooperate with an essentially toroidal form which is mounted on said frame and able to rotate about a first rotation axis and on which said reinforcement is progressively built up by laying arcs of said cord along a trajectory desired for said cord on a surface of said toroidal form;
   a cord laying element through which said cord can slide;
   an actuation mechanism mounted on said frame, to transport said cord laying element in a cyclic, back and forth movement, bringing said cord laying element in successive cycles close to each end desired for said cord in said trajectory, said actuation mechanism comprising a main arm guided by a first auxiliary arm and a second auxiliary arm, the first and second auxiliary arms being articulated on respective geometrical rotation axes that are essentially parallel to one another and a distance apart; and
   pressing elements near each of said ends of said trajectory, to apply said cord onto said toroidal form at least at said ends;
   wherein said main arm is mounted on said first auxiliary arm via a second rotation axis parallel to and spaced from said geometrical rotation axes, and forming an articulation between said main arm and said first auxiliary arm, and wherein said main arm is guided by said second auxiliary arm by means of a cam follower on said second auxiliary arm which cooperates with a slot on said main arm.

2. The device according to claim 1, wherein said actuation mechanism is arranged such that movements of said first and second auxiliary arms are synchronous and can be adjusted to different amplitudes.

3. The device according to claim 1, wherein said actuation mechanism is arranged such that movements of said first and second auxiliary arms are synchronous and are controlled by different motors.

4. The device according to claim 1, wherein said slot is located on that side of said articulation which is more remote from said cord laying element.

5. The device according to claim 1, wherein said main arm directly supports said cord laying element.

6. The device according to claim 1, wherein said cord laying element is an eyelet.

7. The device according to claim 1, used with a motorization system which controls in synchronism the rotation of said toroidal form, said actuation mechanism and said pressing elements, in which said actuation mechanism is mounted on a support which moves relative to said first rotation axis of said toroidal form, this movement being controlled in synchronism with the rotation of said toroidal form by motorization system.

8. The device according to claim 7, wherein said support is moved parallel to said first rotation axis of said toroidal form.

* * * * *